United States Patent
He

(10) Patent No.: US 9,746,039 B2
(45) Date of Patent: Aug. 29, 2017

(54) WEDGE FRICTION CLUTCH WITH ONBOARD ENABLE AND DISABLE FUNCTION

(71) Applicant: Schaeffler Technologies AG & Co. KG, Herzogenaurach (DE)

(72) Inventor: Simon Xunnan He, Troy, MI (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 15/002,165

(22) Filed: Jan. 20, 2016

(65) Prior Publication Data
US 2016/0138662 A1 May 19, 2016

(51) Int. Cl.
| F16D 15/00 | (2006.01) |
| F16D 41/063 | (2006.01) |
| F16D 25/06 | (2006.01) |
| F16D 41/08 | (2006.01) |

(52) U.S. Cl.
CPC ........... *F16D 41/063* (2013.01); *F16D 25/06* (2013.01); *F16D 41/082* (2013.01)

(58) Field of Classification Search
CPC . F16D 41/063; F16D 2127/02; F16D 2129/02
See application file for complete search history.

(56) References Cited

U.S. PATENT DOCUMENTS

| 3,595,354 A * | 7/1971 | Charpentier | F16D 41/063 |
| | | | 188/82.8 |
| 4,186,827 A * | 2/1980 | Spanke | F16D 67/04 |
| | | | 192/18 A |
| 8,286,772 B2 * | 10/2012 | Eisengruber | F16D 41/125 |
| | | | 192/43.1 |
| 9,115,768 B2 * | 8/2015 | Sturgin | F16D 13/14 |
| 9,151,339 B2 * | 10/2015 | Lee | F16D 21/00 |
| 9,188,170 B2 * | 11/2015 | Prout | F16D 25/061 |
| 2002/0027055 A1 * | 3/2002 | Le-Calve | F16D 41/185 |
| | | | 192/46 |
| 2008/0149448 A1 * | 6/2008 | Hemphill | F16D 41/063 |
| | | | 192/45.1 |
| 2013/0248317 A1 * | 9/2013 | Lee | F16D 13/40 |
| | | | 192/70.11 |
| 2015/0276046 A1 * | 10/2015 | Frary | F16D 41/063 |
| | | | 475/116 |
| 2016/0032988 A1 * | 2/2016 | He | F16D 41/063 |
| | | | 192/45.1 |

OTHER PUBLICATIONS

U.S. Appl. No. 14/683,619, filed Apr. 10, 2015, First Named Inventor: Simon Xunnan He, Unpublished U.S. Patent Application.

* cited by examiner

*Primary Examiner* — David J Hlavka

(57) ABSTRACT

A wedge friction clutch with onboard enable and disable function, including: an axis of rotation; an inner race; an outer race; a wedge plate located between the inner and outer races in a radial direction; a first resilient element; and a piston. For a locked mode, the first resilient element is arranged to displace the wedge plate in a first circumferential direction to non-rotatably connect the inner and outer races. For a free wheel mode the piston is arranged to displace in a first radial direction to displace the wedge plate in a second circumferential direction, opposite the first circumferential direction such that the inner and outer races are independently rotatable with respect to each other.

20 Claims, 5 Drawing Sheets

WEDGE FRICTION CLUTCH WITH ONBOARD ENABLE AND DISABLE FUNCTION

TECHNICAL FIELD

The present disclosure broadly describes a wedge friction clutch with onboard enable and disable function. In particular, the clutch includes a wedge plate, resilient element, and piston arrangement that enables operation of the clutch independent of rotation of inner and outer races for the clutch.

BACKGROUND

Wedge friction clutches including inner and outer races and a wedge plate disposed between the inner and outer races are known. It is known to engage and disengage such clutches according to relative rotation of the inner and outer races. However, such an arrangement limits controllability of the clutches. For instance, engaging and disengaging can only be accomplished for specific relative rotation combinations.

A wedge friction clutch with a resilient element to displace a wedge plate in a first circumferential direction for a locked mode (non-rotatably connecting inner and outer races) and with a circumferentially displaceable piston to displace the wedge plate in an opposite second circumferential direction for a free wheel mode (enabling relative rotation between the inner and outer races) is known. However, in the free wheel mode and for high relative acceleration between the inner race and the outer race, a high inertia load from the wedge ring and the outer race can push the piston back in the first circumferential direction, leading to an undesired transition from the free wheel mode to the locked mode, if the hydraulic system for the piston is not stiff enough or the hydraulic pressure on the piston is not high enough. Thus, either the available applications for the clutch are limited to low inertia operation or the energy budget for the clutch must be increased to provide the required hydraulic force to resist the inertial load.

SUMMARY

According to aspects illustrated herein, there is provided a wedge friction clutch with onboard enable and disable function, including: an axis of rotation; an inner race; an outer race located radially outward of the inner race; a wedge plate located between the inner and outer races in a radial direction; a first resilient element; and a piston. For a locked mode, the first resilient element is arranged to displace the wedge plate in a first circumferential direction to non-rotatably connect the inner and outer races. For a free wheel mode the piston is arranged to displace in a first radial direction to displace the wedge plate in a second circumferential direction, opposite the first circumferential direction such that the inner and outer races are independently rotatable with respect to each other.

According to aspects illustrated herein, there is provided a wedge friction clutch with onboard enable and disable function, including: an axis of rotation; an inner race including a chamber; an outer race located radially outward of the inner race; a wedge plate located between the inner and outer races in a radial direction; a first resilient element directly engaged with the inner race and the wedge plate; and a piston disposed in the chamber. For a locked mode, the first resilient element is arranged to displace the wedge plate in a first circumferential direction to non-rotatably connect the inner and outer races. For a free wheel mode, the piston is arranged to displace in a first radial direction to displace the wedge plate in a second circumferential direction, opposite the first circumferential direction, such that the inner and outer races are independently rotatable with respect to each other.

According to aspects illustrated herein, there is provided a method of operating a wedge friction clutch with onboard enable and disable function, including: for a locked mode, displacing, using a first resilient element, a wedge plate in a first circumferential direction to non-rotatably connect inner and outer races with the wedge plate, the inner and outer races located radially inward and radially outward of the wedge plate, respectively; and for a free wheel mode: displacing a piston, disposed in the inner race, in a first radial direction, and displacing, with the piston, the wedge plate in a second circumferential direction, opposite the first circumferential direction such that the inner and outer races are independently rotatable with respect to each other.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1:
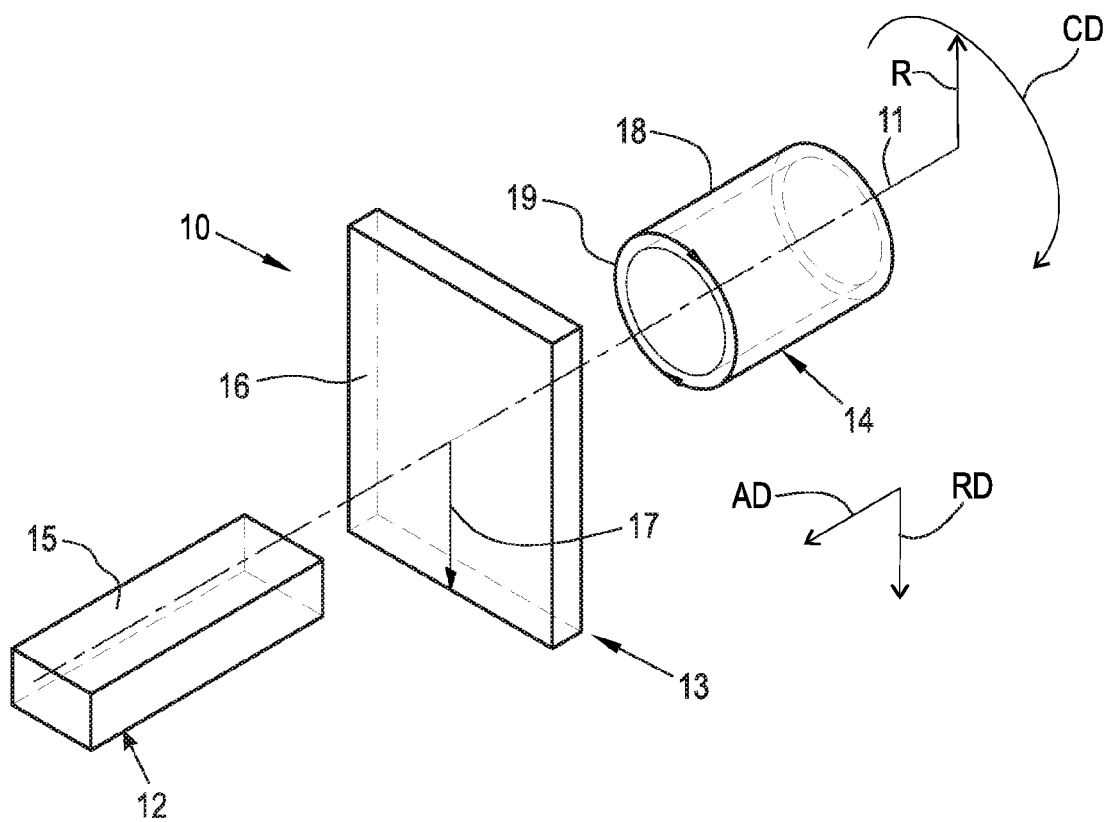
FIG. 1 is a perspective view of a cylindrical coordinate system demonstrating spatial terminology used in the present application.

FIG. 1 is a perspective view of cylindrical coordinate system 10 demonstrating spatial terminology used in the present application. The present application is at least partially described within the context of a cylindrical coordinate system. System 10 includes longitudinal axis 11, used as the reference for the directional and spatial terms that follow. Axial direction AD is parallel to axis 11. Radial direction RD is orthogonal to axis 11. Circumferential direction CD is defined by an endpoint of radius R (orthogonal to axis 11) rotated about axis 11.

To clarify the spatial terminology, objects 12, 13, and 14 are used. An axial surface, such as surface 15 of object 12, is formed by a plane co-planar with axis 11. Axis 11 passes through planar surface 15; however any planar surface co-planar with axis 11 is an axial surface. A radial surface, such as surface 16 of object 13, is formed by a plane orthogonal to axis 11 and co-planar with a radius, for example, radius 17. Radius 17 passes through planar surface 16; however any planar surface co-planar with radius 17 is a radial surface. Surface 18 of object 14 forms a circumferential, or cylindrical, surface. For example, circumference 19 is passes through surface 18. As a further example, axial movement is parallel to axis 11, radial movement is orthogonal to axis 11, and circumferential movement is parallel to circumference 19. Rotational movement is with respect to axis 11. The adverbs "axially," "radially," and "circumferentially" refer to orientations parallel to axis 11, radius 17, and circumference 19, respectively. For example, an axially disposed surface or edge extends in direction AD, a radially disposed surface or edge extends in direction R, and a circumferentially disposed surface or edge extends in direction CD.

Figure 2:
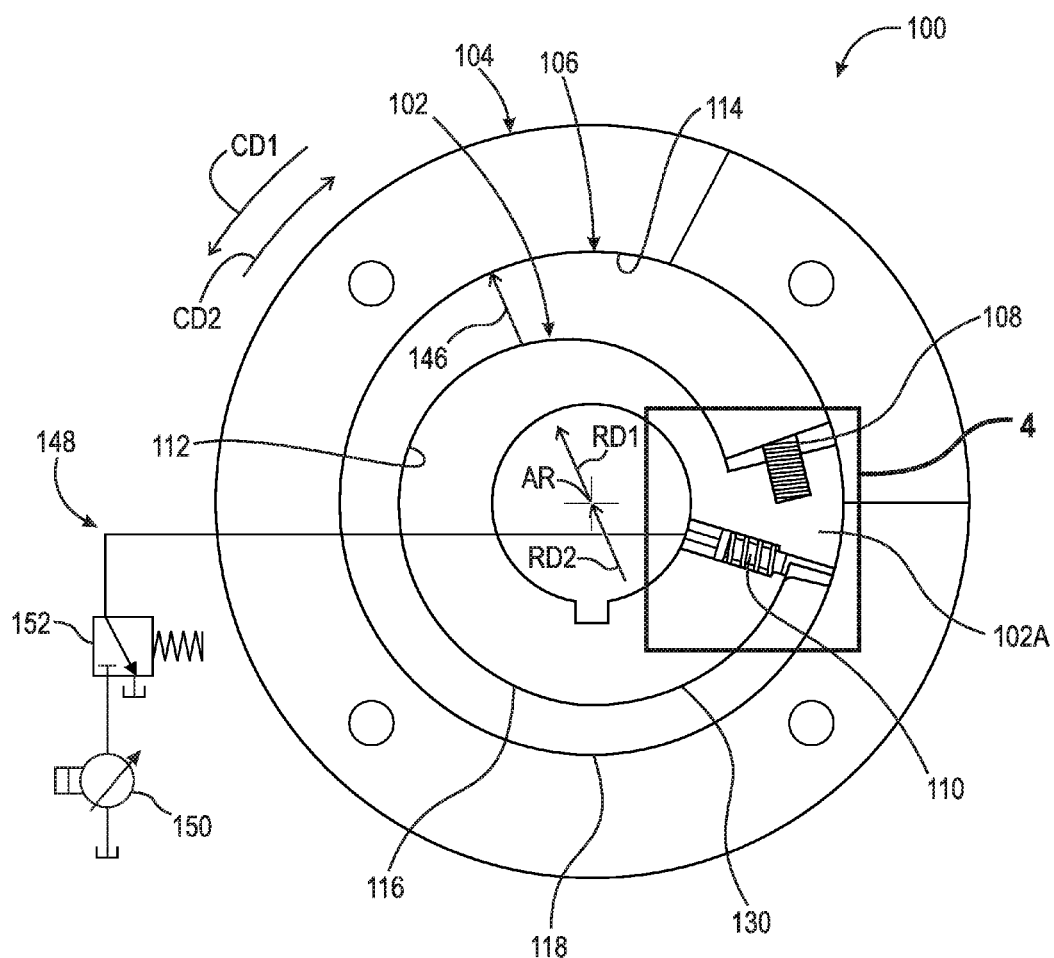
FIG. 2 is a front cross-sectional view of a wedge friction clutch with onboard enable and disable function in a locked mode.

FIG. 2 is a front cross-sectional view of wedge friction clutch 100 with onboard enable and disable function in a locked mode.

Figure 3:
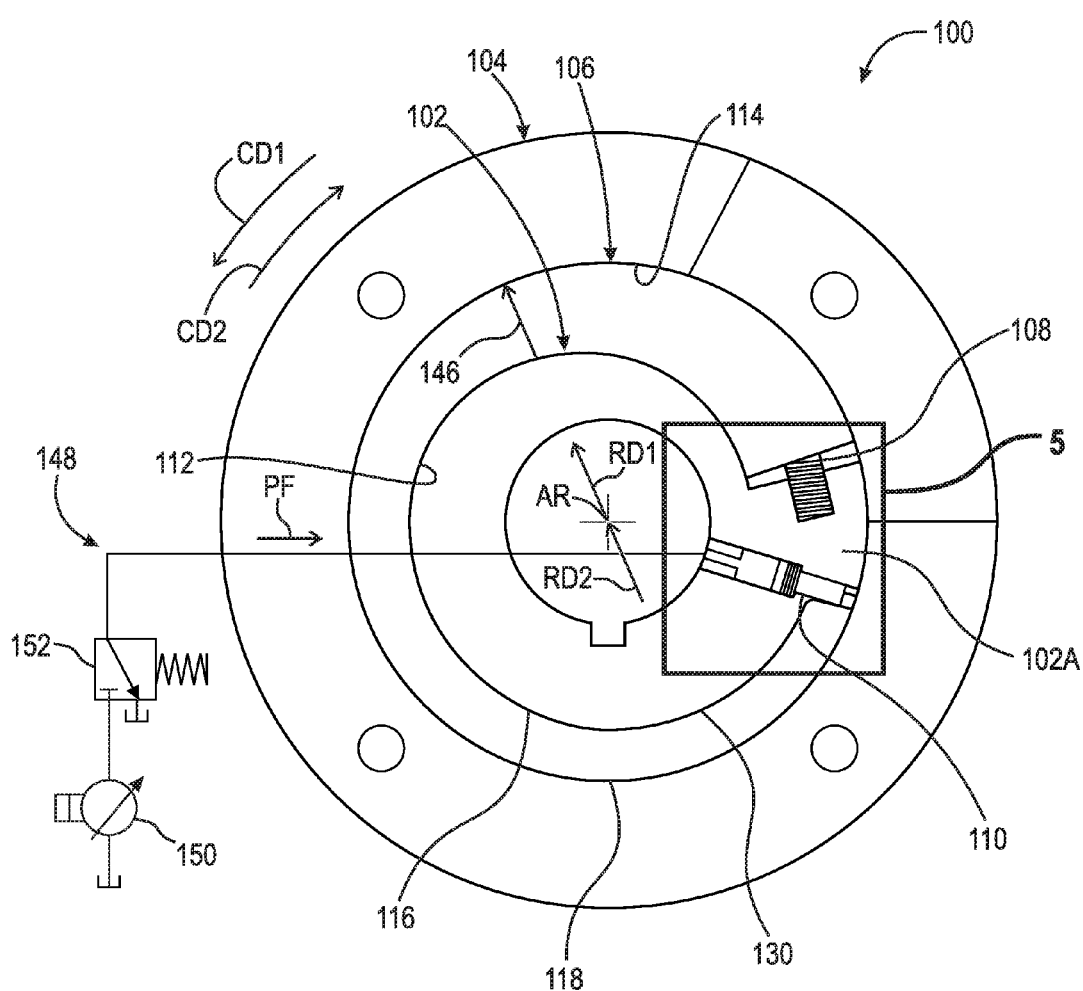
FIG. 3 is a front cross-sectional view of the wedge friction clutch in FIG. 2 in a free wheel mode.

FIG. 3 is a front cross-sectional view of wedge friction clutch 100 in FIG. 2 in a free wheel mode. The following should be viewed in light of FIGS. 2 and 3. Wedge friction clutch 100 includes: axis of rotation AR; inner race 102; outer race 104 located radially outward of inner race 102; wedge plate 106 located between races 102 and 104 in radial direction RD1; resilient element 108; and piston 110. For a locked mode, resilient element 108 is arranged to displace wedge plate 106 in circumferential direction CD1 to non-rotatably connect races 102 and 104. For a free wheel mode, piston 110 is arranged to displace in radial direction RD1 to displace wedge plate 106 in circumferential direction CD2, opposite circumferential direction CD1, such that races 102 and 104 are independently rotatable with respect to each other. By 'non-rotatably' connected components we mean: whenever one of the components rotates, all the components rotate; and relative rotation between the components is not possible.

Race 102 includes radially outermost surface 112. Race 104 includes radially innermost surface 114. Wedge plate 106 includes radially innermost surface 116 and radially outermost surface 118. For the locked mode: at least respective portions of surfaces 112 and 116 are in contact and non-rotatably connected; and at least respective portions of surfaces 114 and 118 are in contact and non-rotatably connected.

Figure 4:
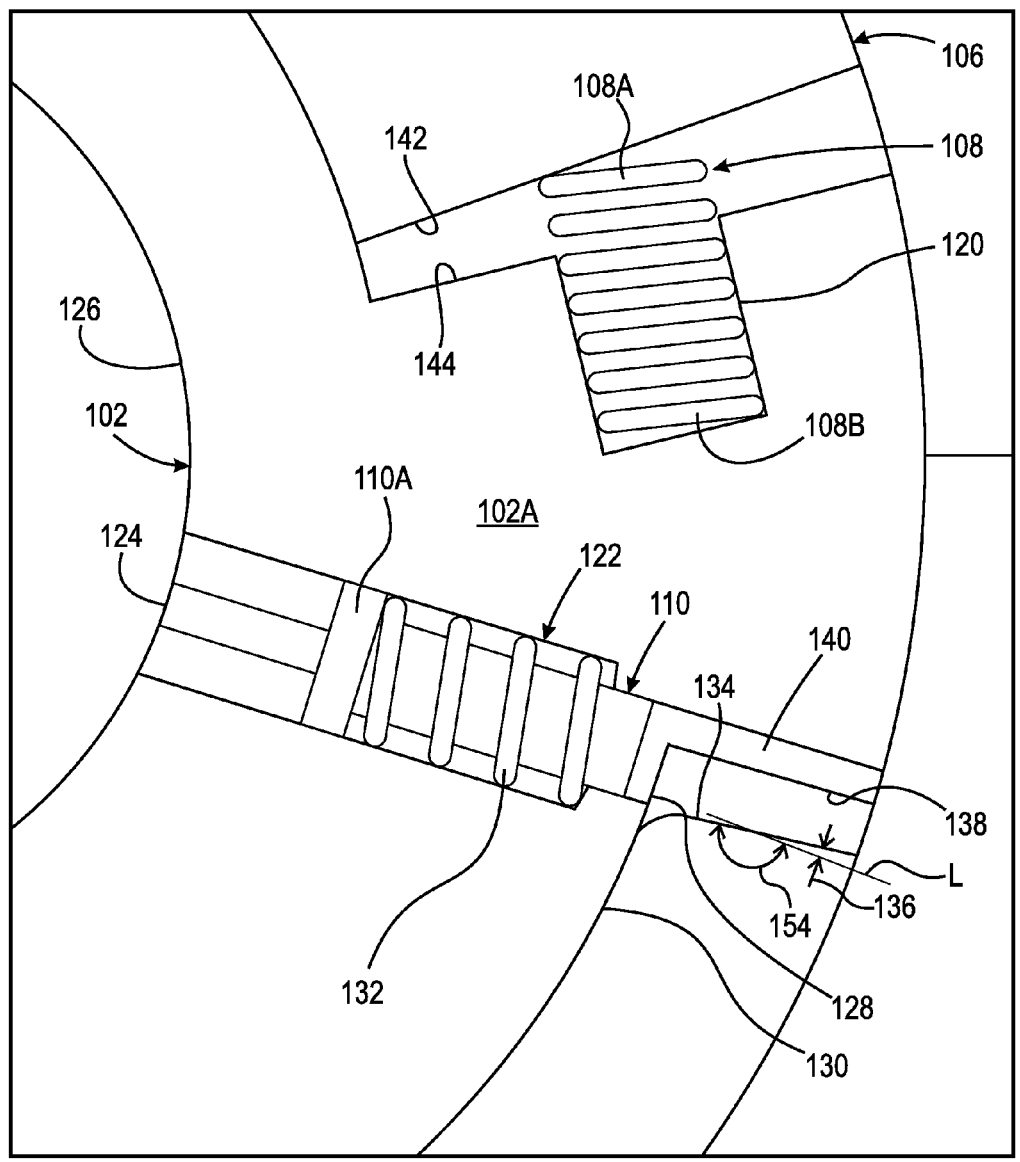
FIG. 4 is a detail of area 4 in FIG. 2.

FIG. 4 is a detail of area 4 in FIG. 2.

Figure 5:
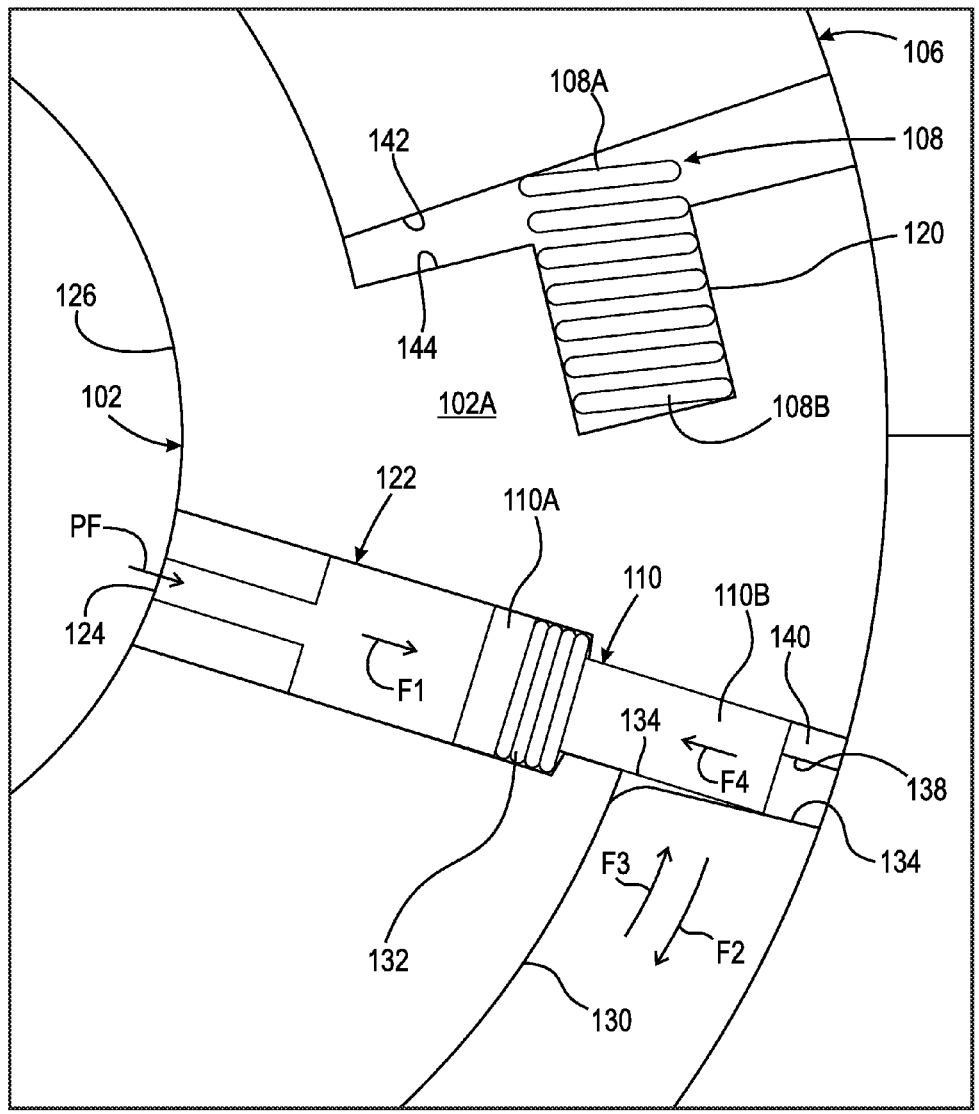
FIG. 5 is a detail of area 5 in FIG. 3.

FIG. 5 is a detail of area 5 in FIG. 3. The following should be viewed in light of FIGS. 2 through 5. Race 102 includes portion 102A extending furthest, in radial direction RD1 (toward outer race 104). Resilient element 108 includes: end 108A directly engaged with portion 102A; and end 108B directly engaged with wedge plate 106. By 'directly engaged' components, we mean that the components are either in contact or are separated by mechanically solid nominal material or components such as a washer. In an example embodiment, portion 102A includes slot 120 and end 108B is disposed in slot 120.

Race 102 includes chamber 122 with opening 124 at inner circumference 126 of race 102 and opening 128 at outer circumference 130 of race 102. At least a portion 110A of piston 110 is disposed in chamber 122. In an example embodiment, clutch 100 includes resilient element 132 located the chamber 122 and urging piston 110 in radial direction RD2, opposite direction RD1. For the locked mode, resilient element 132 is arranged to displace piston 110 in radial direction RD2. In an example embodiment, for the locked mode, resilient element 132 is arranged to displace piston 100 in radial direction RD2 so that an entirety of piston 110 is radially inward of opening 128 and piston 110 does not contact circumferential end 134 of wedge plate 106. In an example embodiment, for the locked mode, resilient element 132 is arranged to displace piston 100 in radial direction RD2 so that an entirety of piston 110 is radially inward of a portion of outer circumference 130 aligned with piston 110 in radial direction RD1.

For the free wheel mode, opening 124 is arranged to receive pressurized fluid PF to displace piston 110 in radial direction RIM so that portion 110B of the piston extends radially beyond opening 128 and contacts circumferential end 134 of wedge plate 106 to displace circumferential end 134 and wedge plate 106 in circumferential direction CD2. In an example embodiment, circumferential end 134 is at acute angle 136 with respect to line L orthogonal to axis of rotation AR. Piston 110 is arranged to slide along circumferential end 134 in radial direction RIM to displace circumferential end 134 and wedge plate 106 in circumferential direction CD2. For example, angle 136 is relatively small so that frictional force opposing displacement of piston 110 along end 134 in direction RIM is minimized and the majority of force F1 generated by fluid PF in direction RIM is efficiently translated into movement of piston 110 in radial direction RD1 and force F2, which displaces wedge plate 106 in direction CD2.

Inner race 102 includes surface 138 facing in circumferential direction CD2. In an example embodiment, surface 138 includes slot 140 extending in radial direction RD1 and open in direction CD2. For the free wheel mode, piston 110 is arranged to contact circumferential end 138 and slot 140. Thus, at least a segment of portion 110B is disposed in slot 140 to stabilize portion 110B.

Wedge plate 106 includes circumferential end 142 facing in circumferential direction CD2. Inner race 102, in particular portion 102A, includes surface 144 facing in direction CD1. Resilient element 108 is circumferentially located between and directly engaged with end 142 and surface 144. For the free wheel mode, portion 110B is circumferentially between and directly engaged with end 134 and surface 138. Dimension 146 of wedge plate 106, in radial direction RD1, increases moving in direction CD2 from end 134 to end 142.

It should be understood that clutch 100 is not limited to the circumferential orientation shown in FIGS. 2 through 5. For example, the configuration of clutch 100 could be circumferentially reversed so that: distance 146 decreases in direction CD2; resilient element 108 is directly engaged with surface 138 and end 134; slot 140 is in surface 144; and piston 110 directly engages surface 144 and end 142.

Hydraulic circuit 148 is schematically represented in FIGS. 2 and 3. For example, circuit 148 includes pump 150 and control valve 152. Pump 150 supplies pressurized fluid PF and valve 152 controls draining of fluid from chamber 122 for the locked mode and transmission of fluid PF for the free wheel mode.

The following should be viewed in light of FIGS. 2 through 5. The following describes a method for operating a wedge friction clutch with onboard enable and disable function. Although the method is presented as a sequence of steps for clarity, no order should be inferred from the sequence unless explicitly stated. A first step, for a locked mode, displaces, using a resilient element, a wedge plate in a first circumferential direction to non-rotatably connect inner and outer races with the wedge plate, the inner and outer races located radially inward and radially outward of the wedge plate, respectively. A second step, for a free wheel mode: displaces a piston, disposed in the inner race, in a first radial direction; and displaces, with the piston, the wedge plate in a second circumferential direction, opposite the first circumferential direction such that the inner and outer races are independently rotatable with respect to each other. A third step transitions the wedge clutch between the locked mode and the unlocked mode for any respective rotation or lack of respective rotation of the inner and outer races.

The following provides further detail regarding wedge friction clutch 100. and a method using clutch 100. Advantageously, clutch 100 operates independent of rotation, or non-rotation, of races 102 and 104. For example, resilient element 108 is arranged to non-rotatably connect races 102 and 104 in the locked mode regardless of any respective rotation or lack of respective rotation of the races 102 and 104; and piston 110 is arranged to transition between the locked mode and the unlocked mode regardless of any respective rotation or lack of respective rotation of races 102 and 104. For example, frictional engagement between respective surfaces of wedge plate 106 and respective surfaces of races 102 and 104 is not needed or used to trigger engagement of clutch 100 or initiate disengagement of clutch 100. Thus, clutch 100 is operable under any and all rotational configurations of races 102 and 104.

Advantageously, piston 110 addresses the problem noted above regarding high inertial loads during operation of clutch 100. Specifically, clutch 100 reduces the power requirement for operation of clutch 100 and eliminates unwanted locking of clutch 100. Once piston 110 is extended into slot 138 in the free wheel mode, piston 110 resists displacement in direction RD2 with either no requirement for maintaining pressurized fluid PF or with a much reduced pressure level for pressurized fluid PF. For example, the inertial load noted above exerts force F3 in direction CD1 on piston 110. Since complementary obtuse angle 154 is relatively large, the frictional force between end 134 and piston 110 is very large. In some cases, the frictional force is greater than force F4 needed to displace piston 110 in direction RD2 and pressurized fluid PF is not needed to maintain the radial position of piston 110. That is, piston 110 is essentially locked by compressive and frictional forces between wedge plate 106 and inner race 102. For larger inertial loads, pressurized fluid PF can be supplied, but at much lower pressure levels than for the known wedge clutch discussed above. Thus, the energy budget for clutch 100 is greatly reduced.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A wedge friction clutch with onboard enable and disable function, comprising:
    an axis of rotation;
    an inner race;
    an outer race;
    a wedge plate located between the inner and outer races in a radial direction;
    a first resilient element; and,
    a piston, wherein:
        for a locked mode, the first resilient element is arranged to displace the wedge plate in a first circumferential direction to non-rotatably connect the inner and outer races; and,
        for a free wheel mode the piston is arranged to displace in a first radial direction to displace the wedge plate in a second circumferential direction, opposite the first circumferential direction such that the inner and outer races are independently rotatable with respect to each other.

2. The friction wedge clutch of claim 1, wherein:
    the inner race includes a first radially outermost surface;
    the outer race includes a first radially innermost surface;
    the wedge plate includes a second radially outermost surface and a second radially innermost surface; and,
    for the locked mode:
        at least respective portions of the first radially innermost surface and the second radially outermost surface are in contact and non-rotatably connected; and,
        at least respective portions of the first radially outermost surface and the second radially innermost surface are in contact and non-rotatably connected.

3. The friction wedge clutch of claim 1, wherein the wedge friction clutch is arranged to transition between the locked mode and the unlocked mode for any respective rotation or lack of respective rotation of the inner and outer races.

4. The friction wedge clutch of claim 1, wherein:
    the inner race includes a portion extending furthest, in the first radial direction, toward the outer race; and,
    the first resilient element includes:
        a first end directly engaged with the portion; and,
        a second end directly engaged with the wedge plate.

5. The friction wedge clutch of claim 1, wherein:
    the inner race includes a chamber with:
        a first opening at an inner circumference of the inner race; and,
        a second opening at an outer circumference of the inner race; and,
    at least a portion of the piston is disposed in the chamber.

6. The friction wedge clutch of claim 5, further comprising:
    a second resilient element located in the chamber and urging the piston in a second radial direction, opposite the first radial direction, wherein for the locked mode, the second resilient element is arranged to displace the piston in the second radial direction.

7. The friction wedge clutch of claim 5, wherein for the free wheel mode, the first opening is arranged to receive pressurized fluid to displace the piston in the first radial direction so that a portion of the piston:
    extends radially beyond the second opening; and,
    contacts a circumferential end of the wedge plate to displace the wedge plate in the second circumferential direction.

8. The friction wedge clutch of claim 7, wherein:
the circumferential end of the wedge plate is at an acute angle with respect to a line orthogonal to the axis of rotation; and,
the piston is arranged to slide along the circumferential end in the first radial direction to displace the wedge plate in the second circumferential direction.

9. The friction wedge clutch of claim 1, further comprising:
a second resilient element, wherein for the locked mode, the second resilient element is arranged to displace the piston in a second radial direction, opposite the first radial direction, so that an entirety of the piston is radially inward of an outer circumference of the inner race radially aligned with the piston.

10. The friction wedge clutch of claim 1, wherein:
the wedge plate includes a circumferential end;
the inner race includes a surface:
  facing in the second circumferential direction; and,
  with a slot extending in the first radial direction; and,
for the free wheel mode, the piston is arranged to contact the circumferential end and the slot.

11. The friction wedge clutch of claim 1, wherein:
the wedge plate includes first and second circumferential ends facing in the first and second circumferential directions, respectively;
the inner race includes first and second surfaces facing in the second and first circumferential direction, respectively;
the first resilient element is circumferentially between and directly engaged with the first circumferential end and the first surface; and,
for the free wheel mode, a portion of the piston is circumferentially between and in contact with the first circumferential end and the first surface.

12. The friction wedge clutch of claim 11, wherein a dimension of the wedge plate, in the first radial direction, increases moving from the first circumferential end to the second circumferential end.

13. A wedge friction clutch with onboard enable and disable function, comprising:
an axis of rotation;
an inner race including a chamber;
an outer race;
a wedge plate located between the inner and outer races in a first radial direction;
a first resilient element directly engaged with the inner race and the wedge plate;
a second resilient element disposed in the chamber; and,
a piston disposed in the chamber, wherein:
  for a locked mode:
    the first resilient element is arranged to displace the wedge plate in a first circumferential direction to non-rotatably connect the inner and outer races; and,
    the second resilient element displaces the piston in a second radial direction, opposite the first radial direction; and,
  for a free wheel mode, the piston is arranged to displace in the first radial direction to displace the wedge plate in a second circumferential direction, opposite the first circumferential direction, such that the inner and outer races are independently rotatable with respect to each other.

14. The friction wedge clutch of claim 13, wherein:
the inner race includes a portion extending furthest in the first radial direction; and,
the first resilient element includes:
  a first end directly engaged with the portion; and,
  a second end directly engaged with the wedge plate.

15. The friction wedge clutch of claim 13, wherein:
the chamber includes:
  a first opening at an inner circumference of the inner race; and,
  a second opening at an outer circumference of the inner race; and,
for the locked mode, the second resilient element displaces the piston in the second radial direction so that the piston does not contact the wedge plate.

16. The friction wedge clutch of claim 15, wherein for the free wheel mode, the first opening is arranged to receive pressurized fluid to displace the piston in the first radial direction so that a portion of the piston:
extends radially past the second opening; and,
contacts a circumferential end of the wedge plate to displace the wedge plate in the second circumferential direction.

17. The friction wedge clutch of claim 16, wherein:
the circumferential end of the wedge plate is at an acute angle with respect to a line orthogonal to the axis of rotation; and,
the piston is arranged to slide along the circumferential end in the first radial direction to displace the wedge plate in the second circumferential direction.

18. The friction wedge clutch of claim 16, wherein:
the inner race includes a surface:
  facing in the second circumferential direction; and,
  with a slot extending in the first radial direction; and,
for the free wheel mode, the piston is arranged to contact the circumferential end and the slot.

19. A method of operating a wedge friction clutch with onboard enable and disable function, comprising:
for a locked mode, displacing, using a first resilient element, a wedge plate in a first circumferential direction to non-rotatably connect inner and outer races with the wedge plate, the inner and outer races located radially inward and radially outward of the wedge plate, respectively;
for a free wheel mode:
  displacing a piston, disposed in the inner race, in a first radial direction; and,
  displacing, with the piston, the wedge plate in a second circumferential direction, opposite the first circumferential direction, such that the inner and outer racers are independently rotatable with respect to each other; and,
transitioning the wedge friction clutch between the locked mode and the unlocked mode for any lack of respective rotation of the inner and outer races.

20. The method of claim 19, further comprising:
transitioning the wedge friction clutch between the locked mode and the unlocked mode for any respective rotation of the inner and outer races.

* * * * *

UNITED STATES PATENT AND TRADEMARK OFFICE
CERTIFICATE OF CORRECTION

PATENT NO. : 9,746,039 B2
APPLICATION NO. : 15/002165
DATED : August 29, 2017
INVENTOR(S) : Simon Xunnan He Page 1 of 1

It is certified that error appears in the above-identified patent and that said Letters Patent is hereby corrected as shown below:

Column 8, Line 53, In Claim 19 "racers" should read --races--

Signed and Sealed this
Sixteenth Day of July, 2019

Andrei Iancu
*Director of the United States Patent and Trademark Office*